United States Patent [19]

Kinjo et al.

[11] 4,015,289
[45] Mar. 29, 1977

[54] VIDEO DISC RECORDING AND/OR REPRODUCING APPARATUS WITH A SINGLE TRANSDUCER HEAD

[75] Inventors: Hisao Kinjo; Fumio Akuwa; Yasuo Haneji, all of Yokohama, Japan

[73] Assignee: Victor Company of Japan, Limited, Yokohama, Japan

[22] Filed: June 20, 1975

[21] Appl. No.: 588,769

Related U.S. Application Data

[63] Continuation of Ser. No. 423,677, Dec. 11, 1973, abandoned.

[30] Foreign Application Priority Data

| Dec. 12, 1972 | Japan | 47-124600 |
| Dec. 12, 1972 | Japan | 47-124601 |
| Dec. 29, 1972 | Japan | 48-1540 |
| Dec. 30, 1972 | Japan | 48-3198 |

[52] U.S. Cl. .................... 360/11; 360/37; 360/78; 360/107; 360/33; 360/66; 358/128
[51] Int. Cl.² ................ H04N 5/795; G11B 21/08
[58] Field of Search ........... 360/37, 38, 35, 11, 360/10, 97, 106, 78, 75, 66, 107, 108, 33; 178/6.6 DD

[56] References Cited

UNITED STATES PATENTS

| 3,407,266 | 10/1968 | Araki | 360/37 |
| 3,524,018 | 8/1970 | Kihara | 360/11 |
| 3,601,536 | 8/1971 | Calfee | 360/37 |
| 3,649,752 | 3/1972 | Kinjo | 360/97 |
| 3,749,827 | 7/1973 | Kinjo | 178/6.6 DD |

FOREIGN PATENTS OR APPLICATIONS 1,213,482 11/1970 United Kingdom ......... 178/6.6 DD

*Primary Examiner*—Bernard Konick
*Assistant Examiner*—Alan Faber

[57] ABSTRACT

A recording and/or reproducing apparatus comprises a signal transducer in the form of a single recording and/or reproducing head. A single step-driving device intermittently steps the head from one track position to another track position on a rotating recording medium to read two separate and alternating sets of tracks. Stepping occurs during a vertical blanking period of a video signal. A synthesized synchronizing signal is generated to compensate for any deficiencies of the synchronizing signal, as originally recorded, and as played back within a reproduced video signal.

4 Claims, 53 Drawing Figures

FIG. 6
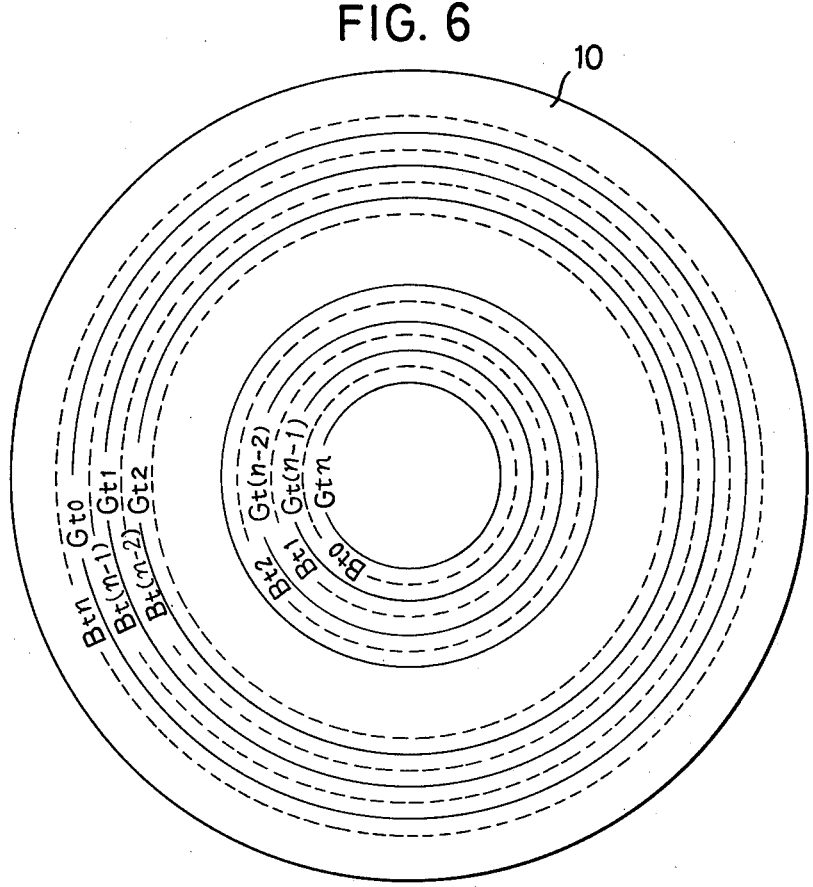
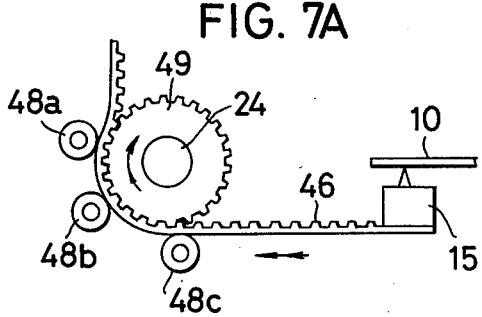
FIG. 7A
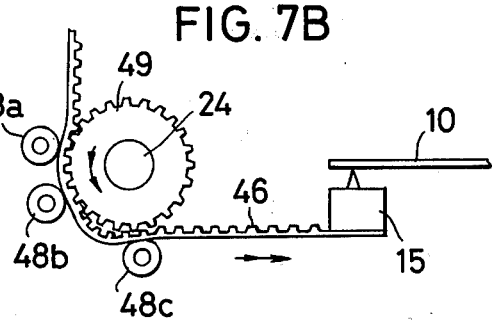
FIG. 7B
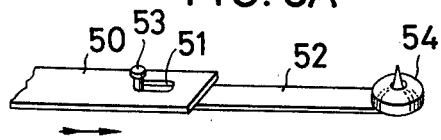
FIG. 8A
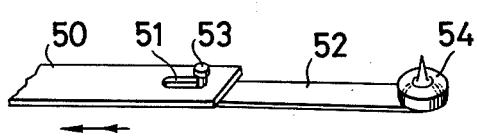
FIG. 8B

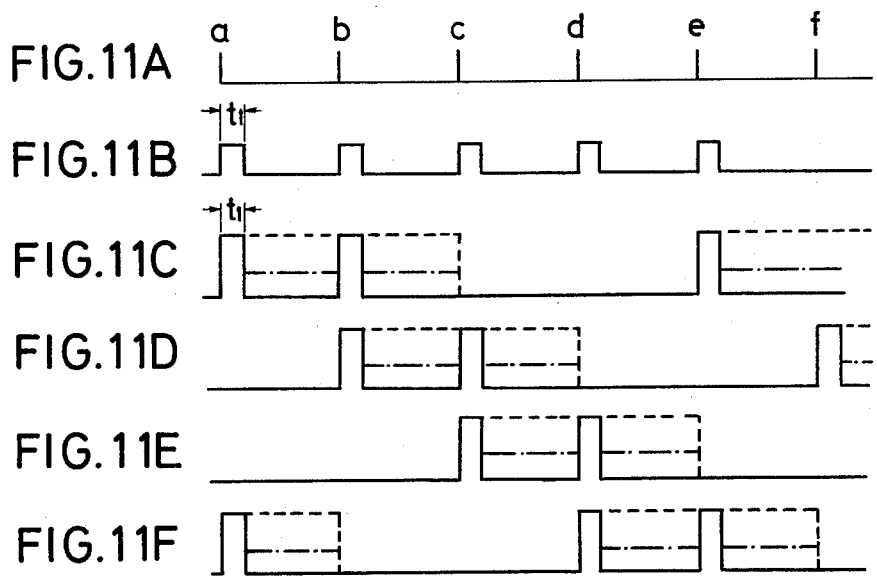
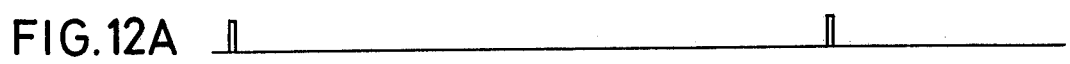
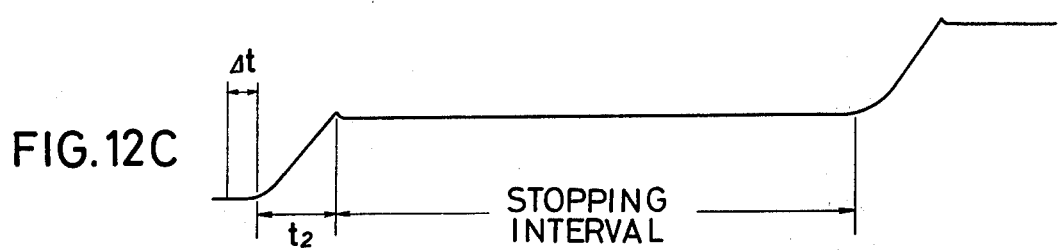
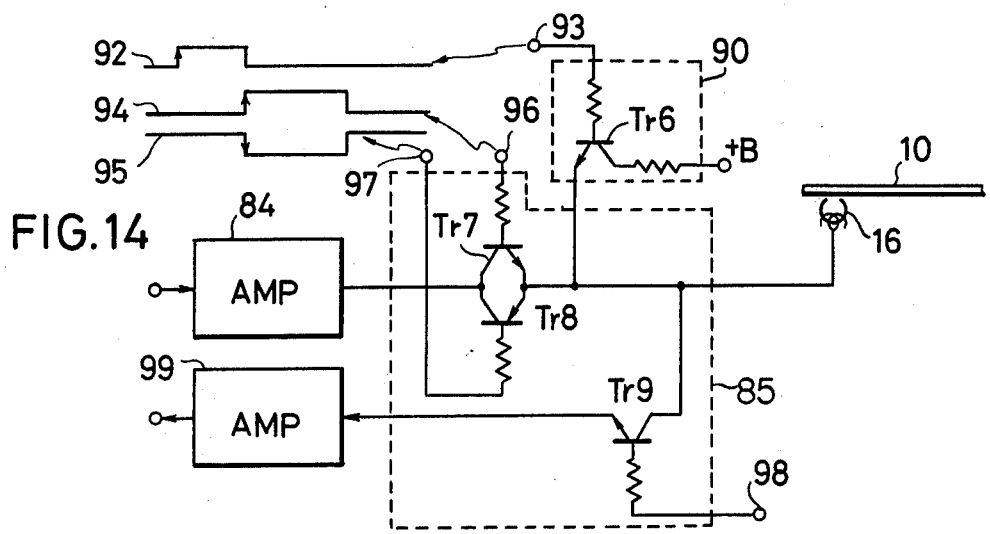

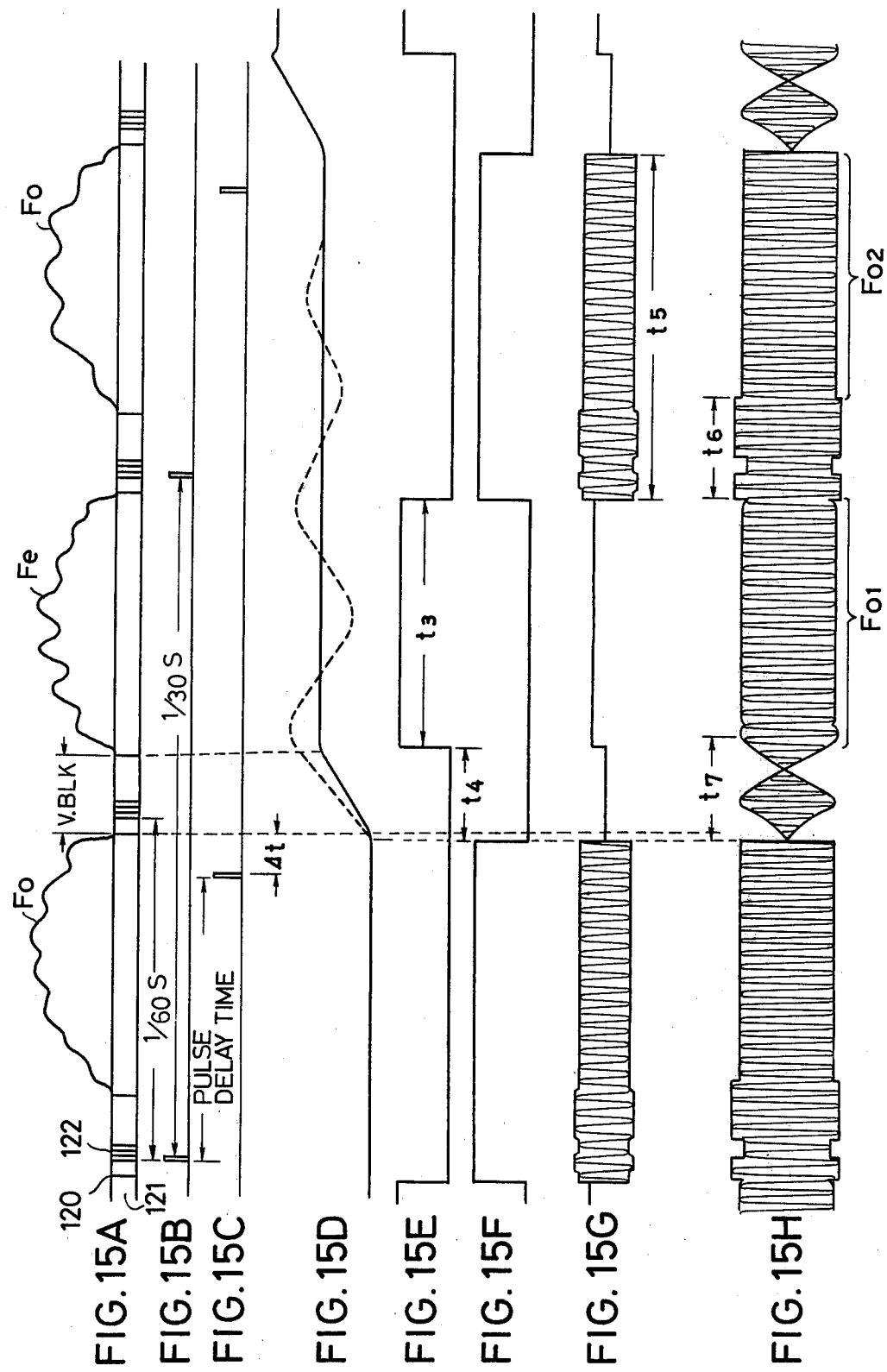

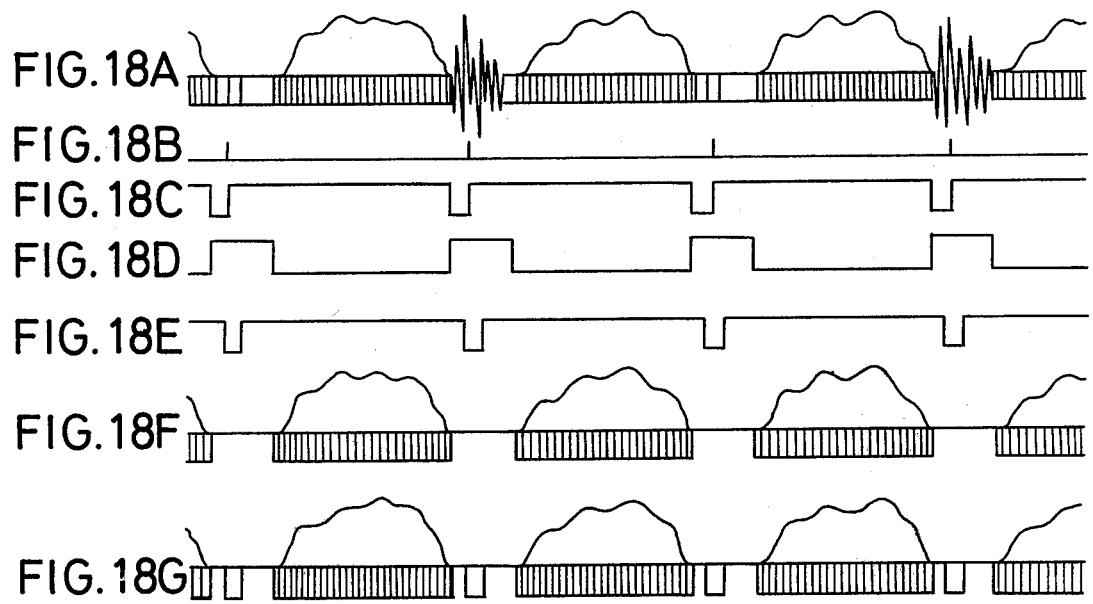
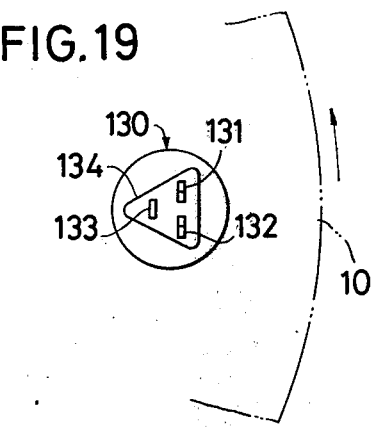
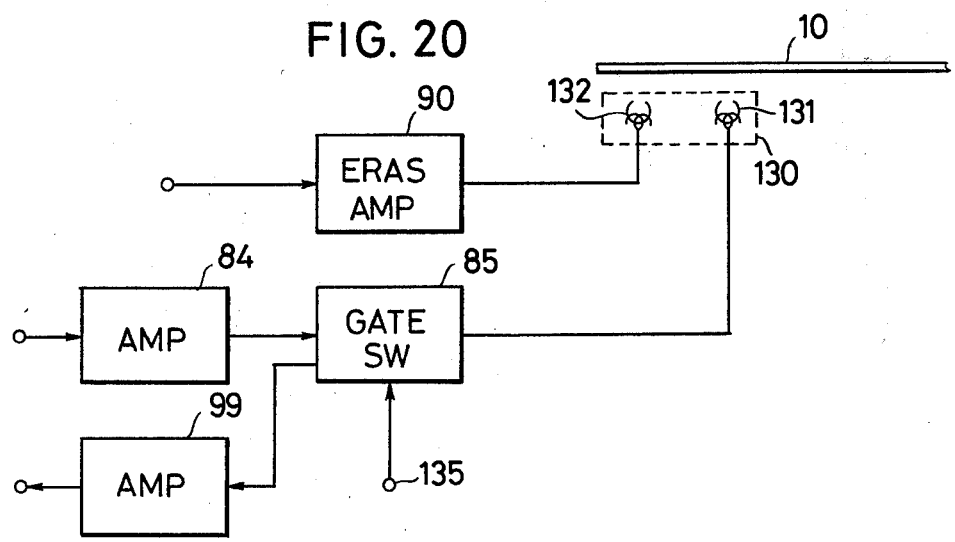

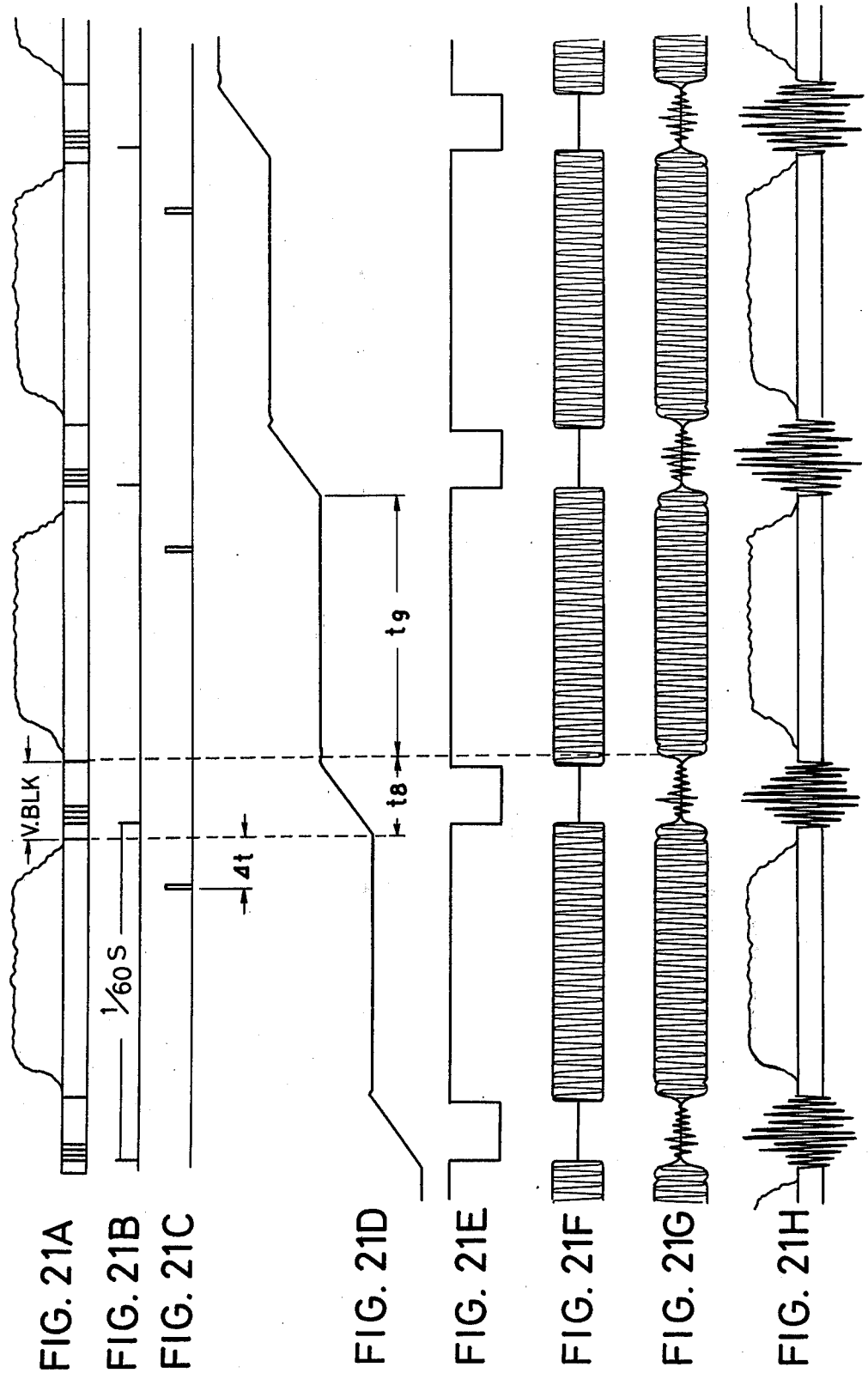

VIDEO DISC RECORDING AND/OR REPRODUCING APPARATUS WITH A SINGLE TRANSDUCER HEAD

This is a continuation of application Ser. No. 423,677, filed Dec. 11, 1973, now abandoned.

BACKGROUND OF THE INVENTION

This invention relates to a recording and/or reproducing apparatus of the type which uses a rotating recording medium such as a rotating magnetic sheet or disc. More particularly, the invention relates to an apparatus wherein one head moves over a rotating recording medium within a vertical blanking period of a video signal. A video signal of one field or one frame is recorded and reproduced on each circular track of the medium.

The applicant has previously proposed apparatus a plurality of magnetic heads, for example, two, are alternately and stepwise over a rotating recording medium, such as a rotating magnetic sheet or a rotating magnetic disc. Movement is in the radial direction across the disc to record or reproduce video signals. In this apparatus, each magnetic head intermittently steps over two track pitches at a time and steps over one track pitch only at the time when there is a reversal of the direction of stepping. Thus, the forward path track and the return path track are formed alternately. During each of its stopped periods, each magnetic head records or reproduces one field or one frame of a video signal on the rotating recording medium.

Since two channel heads are used in this previously proposed apparatus, two head systems including driving means for each head are necessary. Therefore, the proposed apparatus had the disadvantages of complexity and high cost.

On one hand, a so-called field-skip recording system, wherein only one head system. The signal of only the odd-number or even-number fields of one frame is recorded in every other fields, has also been proposed. By this system, however, a so-called full-field recording, wherein all fields are recorded, cannot be carried out.

Furthermore, in order to cause a magnetic head to step by two track pitches (in an ordinary forward path or return path) and by one track pitch (at the time of reversal of stepwise advance direction), it has heretofore been the practice to use a pulse motor as a step driving power source. For the applied pulse, two pulses or four pulses are used at the time of 2-track pitch stepping, and one pulse or two pulses at the time of 1-track pitch stepping. Because of the changing of the number of applied pulses in this manner, the circuit for controlling the applied pulses becomes complicated. Moreover, stepping cannot be carried out at high speed.

Accordingly, in order to simplify the organization of the apparatus, it is desirable to use only one head system. Furthermore, in order to record and reproduce video signals of all fields with a magnetic head of one channel, it is necessary to cause the magnetic head to step at high speed within a vertical blanking period because there is substantially no video information at that time. For this purpose, it is desirable that constant pulses be applied to the pulse motor as the head driving power source for both ordinary the stepping and reversal of stepping direction. Furthermore, since the vertical synchronizing signal is not recorded very well at the time of recording, it is necessary to artificially compensate for this loss of vertical synchronizing signal, at the time of reproducing.

SUMMARY OF THE INVENTION

It is a general object of the present invention to provide a new and useful recording and/or reproducing apparatus in which a rotating recording medium is used, and in which the above described disadvantages are overcome, and the above described requirements are fulfilled.

A specific object of the invention is to provide a recording/reproducing apparatus in which, by causing only a magnetic head of one channel to undergo intermittent stepping, either field skip recording or full field recording can be carried out.

Another object of the invention is to provide a recording/reproducing apparatus in which a single magnetic head steps within the vertical blanking period of a video signal.

Still another object of the invention is to provide a recording/reproducing apparatus in which a constant number (for example, one) of pulse or pulses is always applied to a pulse motor irrespective of whether the operation is ordinary stepping or is a reversal of stepping direction thereby to drive a magnetic head in intermittent stepping movement.

A further object of the invention is to provide a recording/reproducing apparatus in which a compensated vertical synchronizing signal is produced at the time of reproducing, corresponding to the period during which a magnetic head steps, is compensated thereby to carry out excellent reproduction.

A still further object of the invention is to provide a recording/reproducing apparatus in which the intermittent rotational movement of a motive power source, such as a pulse motor, is converted positively and accurately into an intermittent translational stepping movement whereby a magnetic head steps.

Other objects and further features of the invention will become apparent from the following detailed description when read in conjunction with the accompanying drawings.

BRIEF DESCRIPTION OF THE DRAWINGS

In the drawings:

FIG. 6 is a plan view graphically indicating the track pattern formed on a recording medium by the device illustrated in FIGS. 5A and 5B;

FIGS. 7A and 7B are elevation views respectively showing a second embodiment of an alternate track forming device at the time of forming a return path track and at the time of forming a forward path track;

FIGS. 8A and 8B are simplified perspective views respectively showing a third embodiment of an alternate track forming device at the time of forming a forward path track and at the time of forming a return path track;

FIGS. 11A and 11B are waveform diagrams respectively showing pulses for controlling a pulse motor and starting exciting current switching pulses for functioning cooperatively with the device illustrated in FIG. 10, and FIGS. 11C through 11F are waveform diagrams respectively indicating the waveforms of a single-phase, a 2-phase, a 3-phase, and a 4-phase exciting current;

FIGS. 12A and 12B are wave form diagrams respectively indicating the waveforms of pulse motor controlling pulses and starting exciting current switching pulses corresponding to FIGS. 11A and 11B, and FIG. 12C is a graph indicating the step response of a pulse motor;

FIG. 14 is a circuit diagram showing a specific embodiment of a gate switcher used in the apparatus shown in FIG. 13;

FIGS. 15A through 15H are waveform diagrams of signals at various parts of the apparatus shown by block diagram in FIG. 13;

FIGS. 18A through 18G are waveform diagrams indicating the nature of signal at various parts of the apparatus shown by block diagram in FIG. 17;

FIG. 19 is a fragmentary plan view showing one embodiment of a head assembly used in a full-field type, video signal recording/reproducing system applicable to the recording/reproducing apparatus according to the invention;

FIG. 20 is a block diagram showing one embodiment of an input/output circuit for the head assembly illustrated in FIG. 19; and FIGS. 21A through 21H are waveform diagrams respectively indicating the nature of various signals in the apparatus of the invention applied to a full-field recording/reproducing system.

DETAILED DESCRIPTION

Figure 1A:
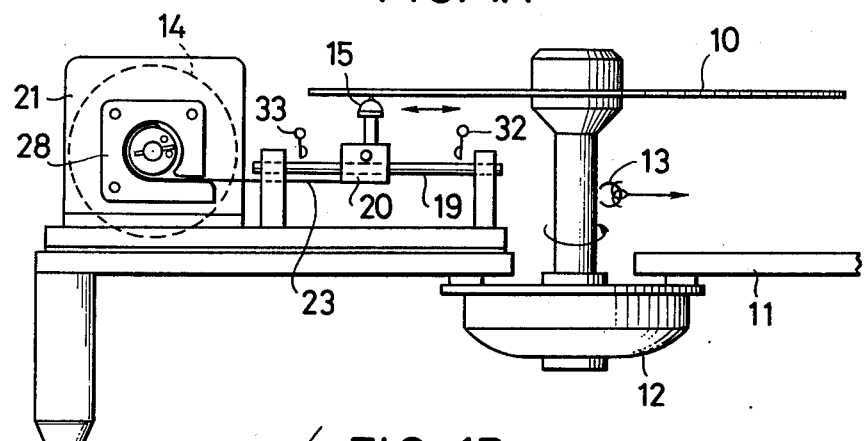
FIGS. 1A and 1B are respectively an elevation view and a partial plan view showing the general organization of an embodiment of a recording/reproducing apparatus, according to the present invention, in which a rotating recording medium is used.

A disc or sheet shaped recording medium 10 is fixed to the vertical shaft of a disc motor 12 mounted on a chassis 11. The disc motor 12 drives this recording medium 10 at a speed of 3,600 rpm in phase synchronism with the vertical synchronizing signal of a television video signal. Stepping occurs during recording or in phase synchronism with a signal from a tone wheel pulse generating device 13 during reproducing. A pulse motor 14 is driven in synchronism with the vertical synchronizing signal of the video signal during recording or in phase synchronism with a control pulse signal during reproducing.

As described more fully hereinafter, the motor 14 is driven responsive excitation with different levels of exciting current at the time of starting as compared to the time of stopping. The motor is driven in a manner such that a head assembly 15 is shifted within the vertical blanking period of the video signal. As a result of the clockwise and counterclockwise rotation of the motor 14, the video head assembly 15 is stepped through an intermittent step driving device, as described below. The head travels stepwise toward the outer periphery of the recording medium 10 and toward the inner periphery thereof, that is, to undergo stepping.

The video head assembly 15 comprises a head 16 for carrying out recording, reproducing, and erasure and dummy cores 17 and 18 thereof, all of which are mounted on a head mounting carriage 20 engaged with and slidably riding on a guide member 19.

Intermittent, step driving device

A first example of an intermittent, step driving device applied in the recording/reproducing apparatus (partly illustrated in FIGS. 1A and 1B) will now be described with reference to FIG. 2. The pulse motor 14 is of the same structural organization as that disclosed in a patent application which the applicant has previously filed, now U.S. Pat. No. 3,681,525, entitled "Digital Rotation Motor." This motor is fixedly mounted on a bracket 21. A belt driving wheel 22, having a diameter of approximately 20 mm, is rotatably supported on a shaft 24 of the motor 14. Wheels 22 holds one end of a metal belt 23 which is wrapped around the outer periphery of this wheel and terminally anchored thereto at one point on the outer periphery. On the outer face of this driving wheel 22, there are a fixed stop pin 25 and a stop interval adjusting device 26, between which is interposed a knock pin 27 projecting radially outward from the motor shaft 24.

Figure 1B:
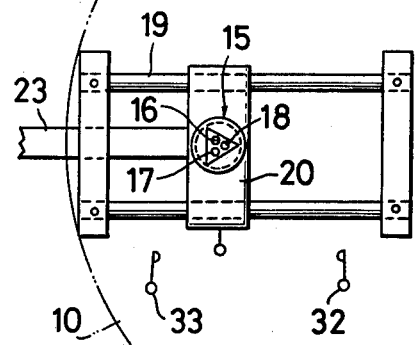

The belt 23 is required to have elasticity and flexibility suitable for following the rotation of the driving wheel 22, to travel smoothly and positively in the direction for being taken up thereon and in the opposite direction for being paid out therefrom. In the instant example, a belt of spring steel of a thickness of 0.15 mm and a width of 8 mm is used. The other end of this belt 23 is fixed to the bottom part of the aforementioned head mounting carriage 20 as shown in FIGS. 1A and 1B.

Figure 2:
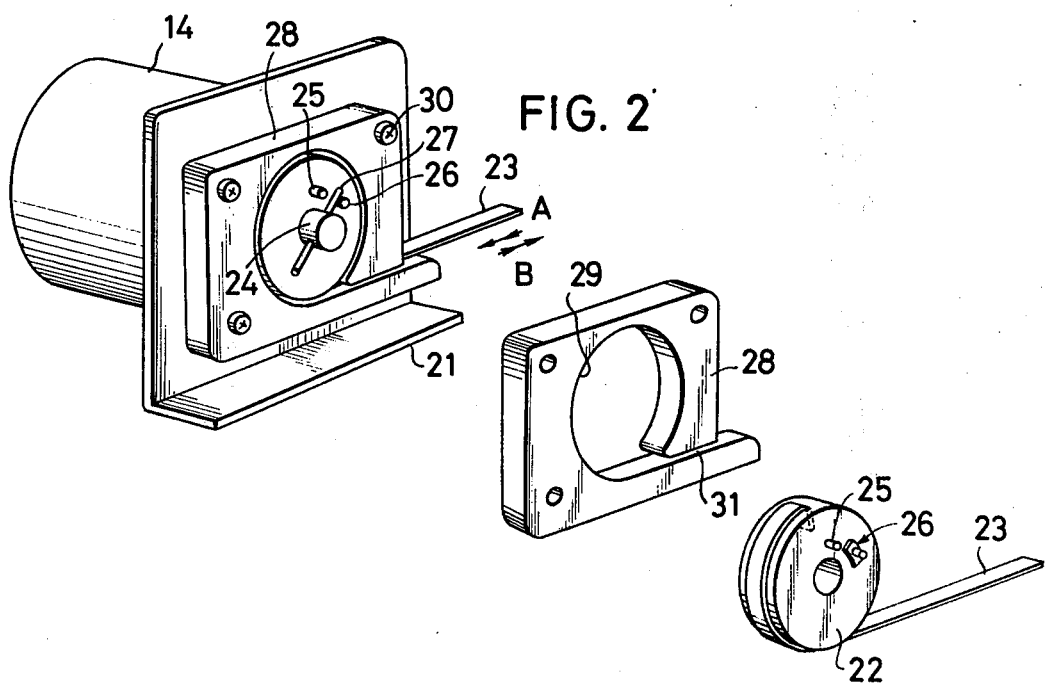
FIG. 2 is a perspective view showing a first embodiment of an intermittent step driving device suitable for use in a head moving part of the apparatus of the invention, the device being shown in disassembled state.

A belt guide member 28 has a shape as shown in FIG. 2. It is preferably formed from a Telfon material in which glass, molybenum, and other substances have been admixed. It has a substantially circular cut-out part bordered by a rim 29 and is mounted on the bracket 21 with mounting screws 30, in an adjusted position at which this rim 29 is concentrially disposed about the driving wheel 22. The guide member 28 is further provided with a guide part 31 which is a break in the rim 29 and which guides the belt 23 in its travel. The diameter of the rim 29 is selected to accommodate therein the belt driving wheel 22 with the belt 23 wound therearound.

When the driving wheel 22 is intermittently driven in the clockwise direction by the pulse motor, the belt 23 is wound around the driving wheel 22 from the end anchored thereto and is intermittently moved in the direction of arrow A in FIG. 2. When the driving wheel 22 is intermittently rotated in the counterclockwise direction, the belt 23 previously wound around the driving wheel 22, guided by the rim 29 and a guide part 31, is paid out in the direction of arrow B in FIG. 2 without slackening thereof within the cut-out part bordered by the rim 29. These traveling movements of the belt 23 in the directions of arrows A and B are accomplished with a prompt following up of a clockwise and counterclockwise rotation of the driving wheel 22.

Furthermore, as a result of the above described traveling of the belt 23, the head assembly 15 is moved along the guide members 19 in the radial direction of the recording medium 10. Recording tracks of concentric circular form are formed on the recording medium 10 by the head 16. The range of movement of the head assembly 15 relative to the recording medium 10 is relatively narrow, whereby the belt 23 is never wrapped more than one turn around the driving wheel 22. For this reason, the stepwise pitch of travel of the head assembly 15 is made always constant. In this connection, the range of movement of the head assembly 15 is set within the range detected by a pair of detecting switches 32 and 33.

In order to prevent slackening of the part of the belt 23 which is wrapped around the driving wheel 22 an confined within the cut out part defined by the rim 29, at the time of change over of the rotational direction of the driving wheel 22 from the belt taking up direction to the belt paying out direction, it is desirable to provide an elastic material (made of rubber) on the outer peripheral surface of the belt driving wheel 22 and to provide a guide ring of spring form at the cut-out part 29 of the belt guide member 28.

Furthermore, in order to prevent the above mentioned malfunctioning, it is also possible to use a substitute arrangement for the guide member 28. More particularly, a plurality of rubber rollers are pressed against an elastic structure made of rubber and provided around the periphery of the driving wheels. The belt 23 is clamped therebetween. In addition, in order to prevent buckling of the belt 23 where it is paid out from the guide member 28, it is desirable to use a belt of a curvilinear cross section.

The relationship for conversion from rotational stepwise movement to linear stepwise movement in the above described device is as follows:

$$D = \frac{360° \times 0.30}{3.14 \times 1.80} = 19.1 \text{ mm.}$$

where:

D is the diameter of the driving wheel 22;
P is the pitch of the tracks recorded on the recording medium 10; and
$\theta$ is the angle of one step of the stepwise advance of the pulse motor 14.

The angle $\theta$ for one step of advance of the motor 14, in the instant example, is 1.8°. For this reason, in order to form alternately a forward path track and a return path track with a specific pitch P of 150 $\mu$m as described hereinafter, the diameter D of the driving wheel becomes as follows:

$$D = \frac{360° \times 2P}{\pi \times \theta} \quad (1)$$

In actual practice, however, D is the diameter of a circle formed by the circular centerline passing through the half-thickness regions of the belt 23 wrapped around the driving wheel 22. When the thickness of the belt 23 is 0.15 mm, for example, the diameter D of the driving wheel becomes D = 19.1 − 0.15 = 18.95 mm.

Figure 3:
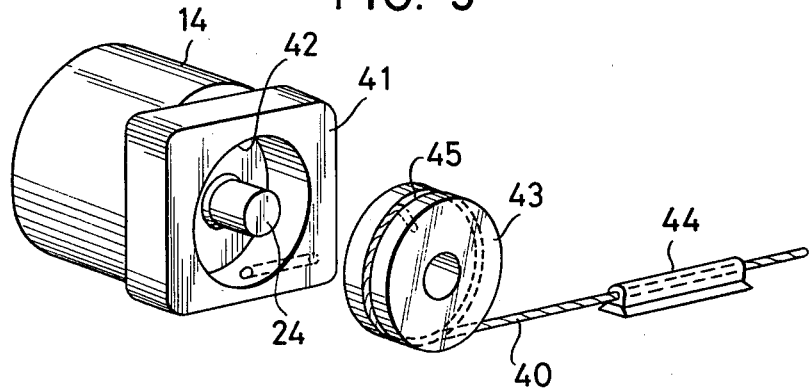
FIG. 3 is a perspective view showing a second embodiment of an intermittent step driving device according to the invention in disassembled state.

Other examples of intermittent, stepwise driving devices will now be described with reference to FIGS. 3 and 4. In the device shown in FIG. 3, use is made of a round belt 40 which has a steel wire as a core material, and which has resilience and flexibility. The belt 40 has the property of not readily buckling under axial compression, similar to the case of the above described metal belt 23. One end part of this round belt 40 is wound around and fixedly anchored at a part of the peripheral surface of belt driving wheel 43. Wheel 43 is fixed on the motor shaft 24 of the pulse motor 14 and enclosed within a cylindrical cavity defined by a rim 42 of a guide member 41. From the driving wheel 43, the round belt 40 is led outside of the guide member 41. After passing through a tubular guide member 44, it is fixed at its other end to a video head assembly (not shown).

When the pulse motor 14 rotates the driving wheel 43 in the belt taking up direction, the round belt 40 fits into a guide groove 45 formed on the peripheral surface of the driving wheel 43. Belt 40 is thus taken up and the head thereby travels stepwise in a straight line. By forming the guide groove 45 in a helical form, the round belt 40 can be wound a plurality of turns around the driving wheel 43 without overlapping or superposing of the belt on itself. By this arrangement, the head can be moved stepwise with uniform pitch over a relatively large travel range.

Figure 4:
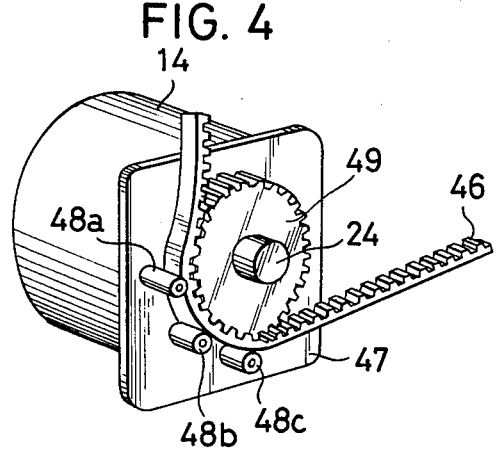
FIG. 4 is a perspective view showing a third embodiment of an intermittent step driving device.

In the example illustrated in FIG. 4, a timing belt 46 of finite length is pressed by stationary guide rollers 48a, 48b, and 48c which are rotatably supported on axial pins embeddedly fixed to a bracket 47. In this state, belt 46 is meshed over a specific angular extent with a timing belt gear 49 fixed on the motor shaft 24 of the pulse motor 14. The timing belt 46 has steel wires embedded in the longitudinal direction thereof. The belt has resilience and flexibility. At the end of its horizontally extending part, a video head assembly (not shown) is secured thereto. The intermittent rotation of the timing belt gear 49 is transmitted positively to the timing belt 46, which is thus caused to travel in two directions, whereby the head assembly (not shown) is caused to travel intermittently and stepwisely. The other end of the belt 46 is not fixed but is free. For this reason, the travel range of the belt 46 is not restricted, whereby the head (not shown) is moved over a relatively wide range of travel.

While, in each of the above described examples, a pulse motor is used as the intermittent drive means, this drive means is not so limited. Examples of other devices which may be similarly used with equal effectiveness are a digital stepwise driving device such as, for example, a rotary solenoid, a star wheel, a Geneva mechanism, and an intermittently rotating device including an ordinary solenoid.

Track forming device

Figure 5A:
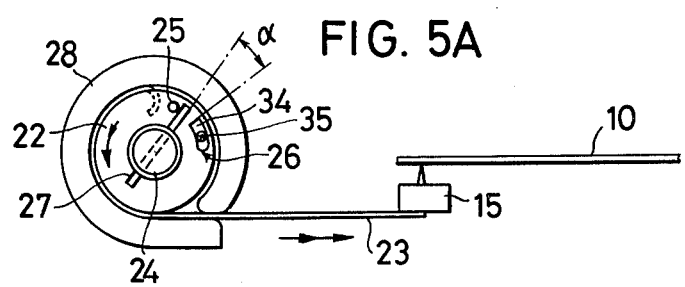
FIGS. 5A and 5B are elevation views respectively showing a first embodiment of an alternate track forming device employed in the recording/reproducing device according to the invention at the time of forming a forward path track and at the time of forming a return path track.
Figure 5B:
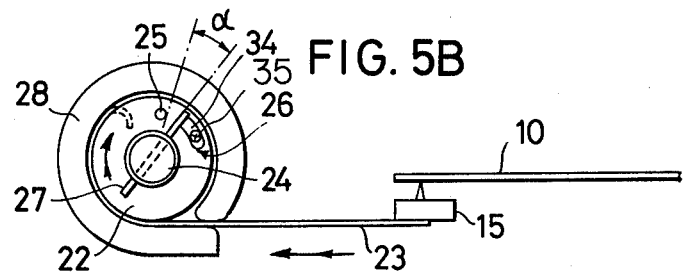

A first example of a track forming device suitable for use in the recording/reproducing apparatus shown in FIG. 1 is illustrated in FIGS. 5A and 5B. These FIGS. 5A, B respectively indicate the states of the device at the time of forming a forward path track and at the time of forming the return path track. In both figures, the parts which are the same as those shown in FIGS. 1 and 2 are designated by the same reference numerals, and the detailed description of these parts will be omitted in the following description.

While the pulse motor (not shown) is driven by a specific excitation system, and the motor shaft 21 is being rotated intermittently in the counterclockwise direction as indicated in FIG. 5A, the belt driving wheel 22 is also driven intermittently in the counterclockwise direction. The stop pin 25 is engaged by the pin 27, and the head assembly 15 is thereby driven responsive to the belt 23 paid out gradually to travel intermittently toward the inner periphery of the rotating recording medium. Here, the diameter D of the driving wheel 22 is so selected that, as expressed in Eq. (1), the head assembly 15 is moved by the distance of two track pitches responsive to one step advance of the pulse motor. Accordingly, as a result of the above mentioned forward path track forming operation, the head assembly 15 is advanced intermittently every two track pitches, and head 16 forms concentric tracks of equal spacing intervals on the recording medium 10. The tracks formed in this operation correspond to the full lines $Gt_0, Gt_1, \ldots, Gt_{(n-1)}, Gt_n$ in FIG. 6.

When the head assembly 15 is moved to the position where its video head 16 forms the inner most track $Gt_n$, the detecting switch 32 operates, and the rotational direction of the pulse motor is reversed. During reverse operation of the pulse motor, it is driven by the same excitation system that is used during the above mentioned counterclockwise rotation. Thus, the motor rotates intermittently with the same rotational angle as mentioned above.

Next to be described is the stepwise movement of the head assembly 15 at the time of the initial intermittent rotation in the clockwise direction of the pulse motor. At this time, the motor shaft 24 rotates through an angle $\alpha$ together with the pin 27 and independently of the driving wheel 22. The pin 27 is placed in the state indicated in FIG. 5B wherein it has come into contact with the engagement part 34 of the stop interval adjusting device 26. Continuously thereafter, the motor shaft 24 is further rotated clockwise. The driving wheel 22 is rotated clockwise with the engagement part 34 engaged by the pin 27, whereupon the first intermittent rotation of the motor shaft 24 is completed.

Here, the position of the engagement part 34 fixed by the holding screw 35 has been adjusted. The angle through which the motor shaft 24 rotates by itself has been set at a value corresponding to an angle slightly less than one half of the angle $\theta$ of one step advance of the pulse motor. For this reason, the rotation angle of the driving wheel 22 becomes one half of the one step angle $\theta$ of the motor shaft 24 as a result of the initial intermittent rotation, in the clockwise direction, of the motor shaft. Accordingly, the initial stepwise advance at the time of return of the video head assembly 15 is limited to one half of the stepwise advance at the time of forming the above mentioned forward path track, that is, to one track pitch, and the track $Bt_0$ indicated in FIG. 6 is formed.

The return path tracks formed thereafter when the driving wheel 22 rotates intermittently and unitarily with the motor shaft 24 is similar to the above described forming of the forward path tracks. For this reason, the head assembly 15 advances intermittently every two track pitches and forms successively the concentric tracks $Bt_1, Bt_2, \ldots Bt_{(n-1)}, Bt_n$ indicated by broken lines in FIG. 6 on the recording medium 10.

After the final track $Bt_n$ of the return path has been formed, the detection switch 33 operates to reverse the rotational direction of the pulse motor. The reversal to again form the forward path tracks is carried out in the same manner as the reversal from forming of the forward path tracks to the forming of the return path tracks. More specifically, the first stepwise advance of the head assembly 15 is limited to one track pitch. Each of the succeeding stepwise advances of the head assembly is two track pitches. The previous forward path tracks are successively erased, and new video signals are recorded in the track parts thus erased.

As a result, as indicated in FIG. 6, forward path tracks and return path tracks of the video head are formed alternately on the disc-shaped recording medium 10.

In the above described device for forming a concentric track pattern, the belt driving wheel 22 is formed from a light material such as aluminum. Furthermore, the belt guide member 28 is adjusted in position so as to cause the belt 23 to be pressed and then secured with a suitable pressure against the driving wheel 22. These provisions prevent excessive rotation of the driving wheel 22 due to momentum at the time of intermittent drive, that is, over-running of the head assembly 15 is prevented. Accordingly, during the operation of forming the forward path and return path tracks, the pin 27 is held in state of continual contact with both the stop pin 25 and the engagement member 34. The head assembly 15 is caused to travel positively with intermittent steps each of two track pitches. As a result, particularly at the time of reproducing, the problems of tracking error due to error in positioning of the head assembly 15 and beat interference in the reproduced signal are solved.

Furthermore, by imparting frictional resistance or viscous resistance by appropriate means to parts such as the driving wheel 22 and the belt 23, the head assembly 15 can be accurately stopped at the proper position at the time of recording/reproducing.

A second example of the concentric alternate track forming device will now be described with reference to FIGS. 7A and 7B, in which parts which are the same as those in FIG. 4 are designated by the same reference numerals. Detailed description of such parts will be omitted in the following description.

FIG. 7A indicates the state of the device at the time of forming of the return path tracks. The timing belt gear 49 is rotated intermittently, together with the motor shaft 24, in the clockwise direction by the pulse motor (not shown). The timing belt 46 is guided by the guide rollers 48a, 48b, and 48c and meshed with the gear 49 and, is moved toward the left as viewed in FIG. 7A. The head assembly 15 is moved intermittently by steps each of two track pitches. By this operation, return path tracks designated by reference characters $Bt_0, Bt_1, \ldots Bt_{(n-1)}$, and $Bt_n$ in FIG. 6 are successively formed on the recording medium 10.

After the final track $Bt_n$ of the return path has been formed, the rotational direction of the pulse motor is reversed by the operation of the detection switch 33. The timing belt gear 49 is rotated intermittently in reverse counterclockwise direction, whereby the timing belt 46 is moved in the reverse direction away from the driving mechanism. In this mechanism, the spacing distance between the guide rollers 48c and 48b, which are disposed at positions where the belt 46 disengages from the gear 49, is made greater than the spacing distance between the guide rollers 48b and 48a. For this reason, when the belt 46 on the free end thereof, guided by the guide rollers 48a and 48b, is sent out from the gear 49. The part of the belt meshing with the gear 49, between the guide rollers 48b and 48c, is not sent out as it is from the driving part under the guidance of the roller 48c. It separates from the gear 49 to slacken and make an incomplete meshing, as indicated within the circular enclosure in FIG. 7B. Consequently, the length of the belt 46 sent out at the time of reversal of rotational direction of the gear 49 is the difference obtained by subtracting the above mentioned slack in the belt from the length of the belt normally sent out. The above mentioned belt slack is here caused by a value corresponding to one track pitch by suitably selecting the positions of the guide rollers 48a, 48b, and 48c and the elastic characteristic of the belt 46.

Accordingly, at the time of reversal of the gear 49, the head assembly 15 reverses its direction of advance and advances stepwise by one track pitch. The initial track $Gt_0$ of the forward path as shown in FIG. 6 is formed.

When the gear 49 thereafter is rotated in the counterclockwise direction, the state of meshing of the belt 46 with the gear 49 is maintained as indicated in FIG. 7B. The head assembly 15 is caused to advance stepwise by two track pitches at a time, whereby formed path tracks $Gt_1$, $Gt_2$, ... $Gt_n$ are formed on the recording medium 10.

When the final track of the forward path, that is, the innermost track $Gt_n$, has been formed, the gear 49 is reversed in rotational direction and is rotated intermittently in the clockwise direction.

As a result of the first intermittent rotation of the gear 49, the part of the belt 46 which is actively meshed with the gear 49 between the guide rollers 48b and 48a reverses its travel direction and is sent out by two track pitches. As a result of this belt movement, first, the above mentioned part of the belt with a slack section corresponding to one track pitch, formed between the guide rollers 48b and 48c is again stretched out to assume the state indicated in FIG. 7A. Thereafter, the belt guided by the guide roller 48c is moved in the reverse direction. For this reason, the head assembly 15 is advanced by one track pitch, and the initial track $Bt_0$ of the return path in FIG. 6 is formed.

Thereafter, as the gear 49 rotates clockwise, the state of meshing of the belt 46 with the gear 49 is maintained as indicated in FIG. 7A, whereby the head assembly 15 is advanced by steps each of two track pitches, and return path tracks $Bt_1$, $Bt_2$, ... $Bt_n$ are newly formed on the recording medium 10.

Accordingly, in the device of the above described construction and operation, forward path tracks and return path tracks are concentrically and alternately formed on the recording medium 10 causing the head assembly 15 to undergo reciprocating movement.

In a third example of a device for forming concentric tracks as illustrated in FIGS. 8A and 8B, a belt 50 is fixed at one end thereof to a driving wheel (not shown). Near its other end, belt 50 has a longitudinal slot 51 of a specific length. In this slot 51 is slidably fitted a pin 53 embeddedly fixed to one end of a coupling arm 52. The slot 51 and the pin 53 are here so adapted that the range of possible relative movement between the belt 50 and the arm 52 corresponds to one track pitch. A head assembly 54 is mounted on the other end of the arm 52.

At the time of forming forward path tracks and at the time of forming return path tracks, the coupling states of the belt 50 and the arm 52 are held respectively as indicated in FIGS. 8A and 8B as the head assembly 54 is advanced in steps, each steps having two track pitches. However, when the direction of movement of the belt 50 is reversed, the head assembly 54 is moved by the distance minus the play stroke of the pin 53 in the slot 51, that is, by one track pitch. Therefore, the forward path tracks and return path tracks are alternately and concentrically formed.

Figure 9A:
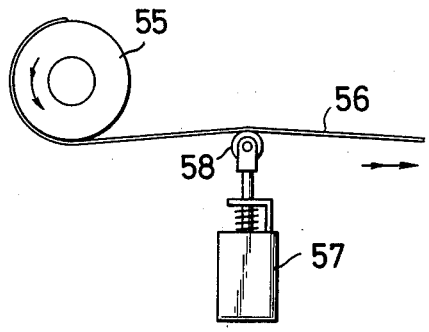
FIGS. 9A and 9B are simplified elevations respectively showing a fourth embodiment of an alternate track forming device at the time of forming a forward path track and at the time of forming a return path track.
Figure 9B:
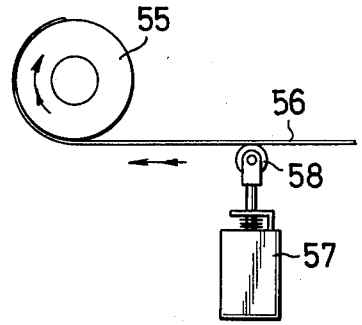
Figure 10:
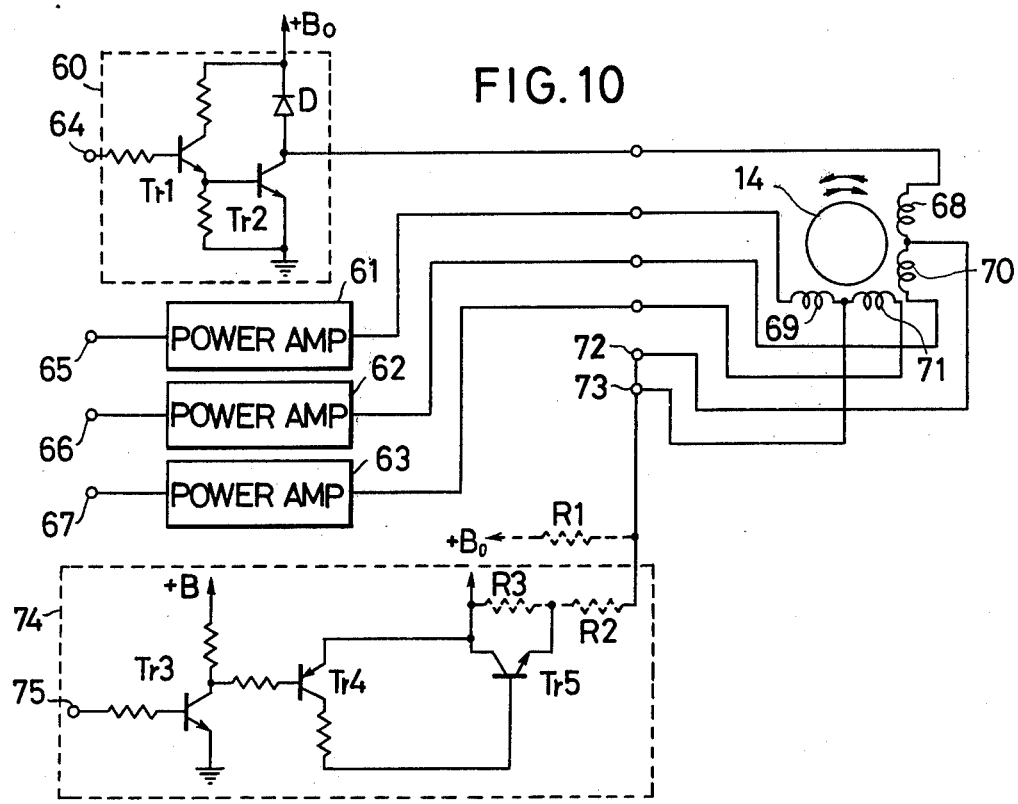
FIG. 10 is a circuit diagram showing one embodiment of a pulse motor drive control device employed in the recording/reproducing device according to the invention.

A fourth example of a concentric track forming device is shown in FIGS. 9A and 9B. A belt 56 is fixed at one end thereof to a belt driving wheel 55 and extends outward, guided by a roller 58 rotatably mounted on the outer end of the plunger rod of a solenoid 57. At its other outer end, belt 56 has a head assembly (not shown). At the time of forming forward path tracks, as indicated in FIG. 9A, the intermittent rotation of the driving wheel 55 in the counterclockwise direction causes the belt 56 to be sent out along a travel path with some curvature as it is guided by the roller 58, whereby the head assembly (not shown) is advanced in steps, each of which steps has two track pitches.

When the innermost track has been formed, the driving wheel 55 is reversed, as described before. It is rotated intermittently in the counterclockwise direction in steps, each of the same angular increment, as at the time of forming forward path tracks. At the same time, furthermore, the solenoid 57 is activated. The engagement of the belt 56 by the roller 58 is terminated. The belt 56 is slackened by a distance equal to one track pitch. Accordingly, at the time of the first intermittent rotation of the driving wheel 55 in the clockwise direction, the head assembly (not shown) in reversed in travel direction and is advanced by one track pitch.

The return path track forming operation consecutively following is carried out as the device is held in the state indicated in FIG. 9B. The head assembly (not shown) is moved in steps, each of two tracks pitches. Then, when the driving wheel 55 is reversed after the outermost track has been formed, the solenoid 57 is rendered inoperative, and the belt 56 is caused by the roller 58 to assume the somewhat curved state shown in FIG. 9A. For this reason, at the time of the first intermittent rotation of the driving wheel 55 in the counterclockwise direction, the stepwise advance of the head assembly (not shown) is limited to one track pitch. The succeeding operation of forming forward path tracks is carried out with the device in the operational state indicated in FIG. 9A. The head assembly (not shown) is moved by the steps, each of two track pitches.

The diameter D of the driving wheel is representable by Eq.(1) set forth hereinbefore in terms of the stepwise advance angle $\theta$ of the pulse motor used in each of the above described examples and the pitch P of the tracks formed on the recording medium. On one hand, the pulse motor is driven by the so-called two-one pulse end control method wherein the pulse motor is normally driven by being supplied with two pulses but is driven by being supplied with one pulse at the time of reversal. The diameter D' of the driving wheel is expressed by the following equation:

$$D' = \frac{360° \times P}{\pi \times \theta} = \frac{1}{2}\left(\frac{360° \times 2P}{\pi \times \theta}\right) = \frac{1}{2}D \quad (2)$$

That is, the diameter D of the driving wheel used in the recording/reproducing apparatus according to the present invention corresponds to twice the diameter D' of the driving wheel used in a conventional apparatus. Accordingly, by the use of the alternate concentric track forming device according to the present invention, the radius of curvature of the part of the belt wrapped around the driving wheel becomes large, whereby the serviceable life of the belt is extended, and, moreover, the load during winding of the belt around the driving wheel becomes small.

Furthermore, in the above described device for forming alternate concentric tracks, the shifting and crossing movement of the head assembly between the tracks is accomplished by one step of the stepwise rotation of the pulse motor. For this reason, the time required for the crossing of the head assembly between tracks is reduced to substantially one half of the time required for shifting of the head of a device responsive to a two-one pulse end control method. The shifting movement of the head assembly is accomplished for the most part within the vertical blanking period of the video signal as described hereinafter.

A further feature of the above described device for forming alternate concentric tracks is that the pulse motor can normally be controlled with a control pulse signal of one pulse, whereby the pulse motor control circuit is simplified.

Pulse motor drive control device

One embodiment of a pulse motor drive control device will now be described with reference to FIG. 10 and FIGS. 11A through 11F.

A control signal is applied to the input terminals 64, 65, 66, and 67 of power amplification circuits 60, 61, 62, and 63. This control signal is formed for each pulse of a reference pulse train as shown in FIG. 11A and is a square wave having a pulse width which is twice the period of the reference pulse train (hereinafter referred to as a two-pulse unit square wave). The output sides of the amplification circuits 60 through 63 are respectively connected to a single-phase excitation winding 68, a two-phase excitation winding 69, a three-phase excitation winding 70, and a four-phase excitation winding 71 of the pulse motor 14.

The power amplification circuit 60 comprises, essentially, an input transistor $Tr_1$ and an output transistor $Tr_2$ undergoing switching operation in the saturation region. The base side of the transistor $Tr_2$ is connected to the input terminal 64, and the collector side of the transistor $Tr_2$ is connected to the single-phase excitation winding 68. Furthermore, the collector sides of the transistors $Tr_1$ and $Tr_2$ are connected respectively by way of a resistor and a protective diode D to a power source terminal +Bo. Accordingly, the transistor $Tr_2$ is in its conductive state only while a two-pulse unit square wave is being applied to the terminal 64.

In this connection, it is to be noted that in a conventional device of this type, the power from the power source + Bo is continually supplied through a resistor $R_1$, as shown by broken lines, to terminals 72 and 73 for supplying power to the center taps of the excitation windings. For this reason, exciting currents as indicated by broken lines in FIGS. 11C through 11F are successively supplied to the excitation windings 68 and 71, whereby the pulse motor 14 is driven intermittently by the double-excitation method.

By the above described conventional driving method, the pulse motor 14 is controlled with an exciting current of a continually constant level unrelatedly to the starting and stopping of the motor. For this reason, the power loss is very large, whereby the efficiency is low, and, moreover, the motor is accompanied by other undesirable features such as excessive heating.

In the device of the present invention, an excitation switching drive circuit 74 is connected to power supply terminals 72 and 73. The circuit 74 comprises, essentially, an NPN-type transistor $Tr_3$ for phase inversion and amplification, a PNP-type transistor $Tr_4$ for phase inversion and amplification, and an output transistor $Tr_5$ for exciting current switching which operates to carry out opening-and-closing switching between collector and emitter.

Starting exciting current switching pulses, as indicated in FIG. 11B, obtained by driving a monostable multivibrator by means of pulse motor control pulses as indicated in FIG. 11A are supplied to an input terminal 75. The pulse width $t_1$ of these switching pulses is set at a time period which is slightly longer than the stepping time period of the pulse motor as described hereinafter. The switching pulses are phase inverted and amplified by the transistor $Tr_3$ and then supplied to the base of the PNP-type transistor $Tr_4$, where they are further phase inverted to their original phase state and then further amplified. The resulting switching pulses are supplied to the base of the transistor $Tr_5$. The transistor $Tr_5$ assumes its conductive state during the period in which a positive bias voltage is being applied on its base. That is, when the transistor $Tr_5$ is "ON", the result is equivalently the same as if the power source +Bo were connected to the terminals 72 and 73 through shorted collector and emitter of the transistor $Tr_5$.

Then, while the rotor of the pulse motor 14 is rotating, the transistor $Tr_5$ is in the "ON" state. While the rotor is stopped, the transistor $Tr_5$ is in the "OFF" state. As a result, the current from the power source +Bo to the power supply terminals 72 and 73 is supplied only when the pulse motor 14 is in the stepping operation. Exciting currents of the waveform shown by full lines in FIGS. 11C through 11F are supplied to the excitation windings 68 through 71 of the pulse motor 14. That is, the pulse motor is supplied with an exciting current from the power source +Bo to step at high torque and high speed during only the short time intervals while it is intermittently energized. It is held in the stopped state when no exciting current whatsoever is supplied thereto. For this reason, the pulse motor 14 is controlled with very high efficiency.

In the recording/reproducing apparatus according to the present invention, the pulse motor operates to move intermittently with a lightly loaded head assembly. For this reason, even when the pulse motor is driven without imparting a self-holding torque at the time when it is stopped, the head assembly is positioned positively and accurately at a prescribed position. The concentric tracks are formed or traced without any accompanying problems whatsoever.

In addition, a resistor $R_2$ is provided in order to reduce the circuit time constant at the time of excitation and driving of the pulse motor.

In another embodiment of a device for controlling the drive of the pulse motor, a resistor $R_3$ of high resistance value is inserted and connected between the collector and emitter of the switching transistor $Tr_5$. In a device of this circuit arrangement, with respect to the period when the pulse motor 14 is stopped and the transistor $Tr_5$ is in its nonconductive state, the current from the power source $+Bo$ is supplied by way of the resistor $R_3$ to the excitation windings. The exciting current at this time is set at a value necessary for holding the pulse motor positively in the stopped state. This stopping current is approximately ⅓ of the value of the exciting current for normally starting the pulse motor. The exciting current for the excitation of windings 68 through 71 of the pulse motor during its driving becomes as indicated by single-dot chain line in FIGS. 11C through 11F.

While a two-pulse unit square wave is supplied to the input terminals 64 through 67 in the above described embodiments, it is possible, also by applying successively and selectively a switching pulse as indicated in FIG. 11B to the input terminals 64 through 67, to drive the pulse motor 14 with low power consumption similarly as in the above described embodiments.

The stepping operating of the pulse motor caused by the above described device for controlling the drive of the pulse motor will now be described with reference to FIGS. 12A, 12B, 12C. FIGS. 12A and 12B respectively indicate the pulse motor control pulses and the exciting starting current indicated in FIGS. 11A and 11C. FIG. 12C indicates the pulse motor step response. The pulse motor 14 starts stepping operation after being delayed by a responsive delay time $\Delta t$ because of effects such as the inductances of the excitation windings after the start of flow of the exciting current. The relationship of the stepping operation time $t_2$ of the motor 14 to the time $t_1$ during which the exciting starting current is passed is set to be of the order indicated below.

$$t_1 \geq \Delta t + t_2$$

In the above described four-phase-two excitation pulse motor, the response delay time $\Delta t$ is from 1.0 to 1.5 ms., and the stepping operation time $t_2$ is approximately 2 ms. Therefore, the time $t_1$ of passage of the exciting starting current is set at a value of the order of 5 ms.

While the pulse motor drive is controlled by a four-phase-two excitation method in the above described embodiment, the above described device for drive controlling a pulse motor can also be applied in the case where the pulse motor is adapted to be driven with another exciting method.

Video signal recording/reproducing apparatus of field-skip system

Next to be described is one embodiment of a video recording/reproducing apparatus comprising a cooperatively operating combination of the above described device for forming concentric tracks and the above described pulse motor drive controlling device.

First, the video signal recording operation will be described with reference to FIG. 13. Video signals from a television receiver 80 or a television camera (not shown) pass through an appropriately switched input changeover switch 81 and are then supplied to a frequency modulation circuit 82 and a synchronizing signal separation circuit 83. The modulation circuit becomes operative only at the time of recording and at the time of operation of an E-E system as described hereinafter. At the time of reproducing, it is held in the inoperative state in order to prevent beat interference. A video signal thus supplied to the modulation circuit 82 is there suitably frequency modulated, and then its level is amplified by an amplification circuit 84. Thereafter, the resulting signal passes through a gate switcher 85 and is supplied to the head 16 within the head assembly 15.

On one hand, in the separation circuit 83, the vertical synchronizing signal separated from the video signal is supplied to a servo-amplification circuit 86 and a control pulse generating circuit 87. To the servo-amplification circuit 86, a pulse signal from a tone wheel pulse generating part 13 is supplied and is phase compared with the above mentioned vertical synchronizing signal. The output signal from the amplification circuit 86 is amplified by a disc motor drive amplification circuit 88 and then applied to the disc motor 12, which is phase synchronization controlled with the video signal and driven.

The control pulse generating circuit 87 is supplied, in addition to the above mentioned vertical synchronizing signal, with a signal from a control operation box 89 for generating various command signal in accordance with the control operations of the apparatus. Circuit 87 transmits various switching pulses based on the vertical synchronizing signal. The output pulse signal of this circuit 87 is supplied to an erasure amplification circuit 90, the modulation circuit 82, the gate switch 85, and a pulse motor driving amplification circuit 91. The pulser motor 14 is driven by an output signal from the amplification circuit 91 to advance by one step for every two revolutions of the disc motor revolutions of the disc motor 12. Furthermore, the switch contact points of the detection switches 32 and 33 are connected to the control pulse generating circuit 87 and perform logic operation of head position detection, head start position detection, and the like at the time of reciprocating movement of the head.

The gate switcher 85 is activated by the above mentioned switching pulses to couple the erasure amplification circuit 90 to the video head 16 in advance of the process of recording the video signal and then to uncouple the circuit 90 and couple the amplification circuit 84 to the head 16. As a result, old information signals previously recorded on the recording medium 10 are erased prior to the instant recording operation.

Specific examples of the gate switch 85 and the erasure amplification circuit 90 are shown in FIG. 14. A pulse signal 92 generated by the control pulse generating circuit 87 is applied to an input terminal 93 of the amplification circuit 90. Pulse signals 94 and 95 are similarly applied respectively to input terminals 96 and 97 of the gate switch 85.

A transistor $Tr_6$ of the amplification circuit 90 is in its conductive state. The positive component of the pulse signal 92 is applied thereon, and a current from the power source +B is supplied through a resistor and the transistor $Tr_6$ to the video head 16. The signals previously recorded on the recording medium 10 are erased in advance. At this time, a low-level signal and a high-level signal are being applied respectively to the bases of an NPN-type transistor $Tr_7$ and PNP-type transistor $Tr_8$. Both of these transistors are in their nonconductive states. For this reason, the output video signal from the amplification circuit 84 is shut off from the head 16.

After a specific time, the base potential of the transistor $Tr_6$ decreases, whereupon this transistor is rendered nonconductive. As a result, the erasure bias current from the power source +B to the head 16 is shut off, and the operation for erasing the recorded signal is completed. At this time, positive and negative potentials are applied respectively to the bases of the transistors $Tr_7$ and $Tr_8$, which are thereupon changed into their conductive states. Consequently, the recording system circuit is closed, and the video signal is recorded by the same video head 16 mentioned above on the track which has just been erased on the recording medium 10.

In the reproducing operation described below, a transistor $Tr_9$ is rendered conductive by an input pulse signal applied to a terminal 98. A reproduced video signal picked up by the video head 16 is supplied by way of the transistor $Tr_9$ to a reproducing preamplification circuit 99.

The operation of reproducing video signals will now be described. When the apparatus is placed in the reproducing mode of operation, the gate switcher 85 is changed over to the reproducing side by a signal from the control operation box 89 as described hereinabove. The disc motor 12 and the pulse motor 14 are controlled and driven by the input video signal from the television receiver for monitoring 80 or the television camera in the same manner as in the recording mode. A weak RF output signal picked up by the head 16 is suppled through the above mentioned gate switcher 85 to the amplification circuit 99, where it is amplified. The signal thus amplified is supplied to a gate switcher 100.

This gate switcher 100 is activated in a switching operation responsive to switching pulse signals from the control pulse generating circuit 87. At the time of recording, this gate switcher 100 introduces a modulated RF signal from the modulation circuit 82 to the output side. At the time of reproducing, it introduces a reproduced RF signal from the amplification circuit 99 to the output side.

The above mentioned reproduced RF signal is supplied through the gate switcher 100 in the above mentioned switching state to a frequency demodulation circuit 101, where it is demodulated into the original video signal. This demodulated video signal undergoes signal processing as described hereinafter and is then supplied to the aforementioned television receiver 80.

Since the switching operations of the above mentioned gate switchers 85 and 100 are carried out instantaneously in periods of the order of microseconds, the operations of erasure in advance, recording, and reproducing are carried out by a single video head 16 without signal switching noise, signal deficiency, and disorder or distortion of the reproduced image.

The recording operation of the above described recording/reproducing apparatus will now be described with reference to the principal switching pulses and waveforms at various parts thereof.

FIG. 15A shows an input video signal which is composed of a video information signal part 120 and a synchronizing signal part 121. The vertical blanking period (V.BLK) corresponds to the interval between an even-number field signal Fe and an odd-number field signal Fo and is specified as $0.07V _0^{+0.01}$, corresponding to approximately from 1.2 to 1.3 msec. The disc motor 12 is rotated at a speed of 3,600 rpm in phase synchronism with a certain vertical synchronizing signal part 122 every 1/60 second. Frame pulses for discriminating the odd-number field Fo and even-number field Fe are indicated in FIG. 15B. The period of these pulses is 1/30 second.

Pulse motor drive control pulses indicated in FIG. 15C correspond to pulses shown in FIGS. 11A and 12A and are delayed by approximate one field time relative to the above mentioned frame pulses by a delay multivibrator or the like. As indicated in FIG. 12C, the stepping operation of the pulse motor is accompanied by some mechanical time delay relative to the time of application of the pulses. In order to carry out the stepping operation (that is, the shifting of the head assembly to the succeeding track) within the vertical blanking period, the above mentioned signal is transmitted at a position determined with allowance for the response delay time $\Delta t$ of the pulse motor.

The step response characteristic of the pulse motor 14 is indicated in FIG. 15D, wherein the sloped part of the curve corresponds to the stepwise movement (approximately 2 msec.). The horizontal part corresponds to the stopped position. The stepwise movement time is somewhat greater than the period V.BLK, since it is actually set so that the receiver 80 will deflect with over sweep. Disorder of the picture accompanying head shifting does not occur in the reproduced picture.

In a conventional pulse motor, a hunting phenomenon occurs after a stepwise advance in accordance with a time constant determined by the rotational momentum or inertial force of the rotor and the excitation attractive force. The rotor stops after undergoing a damped oscillation in the order of three cycles after the stepwise advance, as indicated by broken line in FIG. 15D. However, the pulse motor 14 used in the apparatus of the present invention is the aforementioned motor disclosed in U.S. Pat. No. 3,681,525. The hunting phenomenon at the time of the stepwise movement is completely prevented by viscous damping due to oils. Therefore, the above described ideal step response characteristic is obtained.

A pulse signal for signal erasure is indicated in FIG. 15E which corresponds to the pulse signal 92 in FIG. 14, During the period preceding the positive signal period of this pulse signal (that is, during the positive signal period of the pulse for the signal switching described below) the recorded signals on the recording medium 10 are erased beforehand. Since, as described hereinbefore, the head assembly 15 is moved two track pitches at a time as it straddles over one track, a bias current for erasure supplied to the head 16 is applied in a manner to avoid the head shifting periods. More specifically, as indicated in FIG. 15E, the positive polarity time $t_3$ of the pulse signal for signal erasure is set at a time resulting from the subtraction from one field time 16.6 msec. of a time slightly longer than the time $t_2$ required for head shifting, that is, 2.6 msec. in the instant example. That is, the time $t_3$ is set at 16.6 − 2.6 = 14 msec. As a result, a portion in the order of 15 percent of the recording completed video signals remains without being erased. By suitably gating this portion is removed from the reproduced video signal at the time of reproducing operation as described hereinafter, problems are prevented from occurring at the time of reproducing operation.

A pulse signal for signal switching in indicated in FIG. 15F and corresponds to the pulse signal 94 in FIG. 14. This pulse signal for switching is generated with the frame pulse shown in FIG. 15B as reference and, moreover, in an interrelated manner with the pulse motor response characteristic indicated in FIG. 15D. In the positive polarity period of this pulse signal, odd-number field modulation RF signals successively extracted from input video signals are supplied to the head 16 and thus recorded in the track which was erased beforehand by the above mentioned pulse signal for erasure. Furthermore, the changeover operation of this pulse signal is carried out at the completion of one field, but the noise at the time of changeover is feeble and does not appear in the motor at the time of reproducing operation.

FIG. 15G indicates a signal supplied to the head 16 at the time of normal recording state, that is, at the time of field skip recording. In this signal, a direct-current erasing bias signal and a gated modulated RF signal are superimposed. The bias signal is applied from the erasure amplification circuit 90 shown in FIG. 13 through the gate switcher 85 to the head 16. In FIG. 15G, the signal superimposition, recording period $t_4$ corresponds substantially to the time required for the stepwise advance of the pulse motor 14 and is set at approximately 2.5 msec. in the instant example. The signal writing recording period $t_5$ corresponds to a complete one-field period.

As has been described, when the recording medium 10, on which the video signal has been recorded in the field-skip manner, is normally reproduced, a reproduced RF signal as indicated in FIG. 15H is obtained from the video head 16. Specifically, during the reproducing mode, the video head 16 traces each track, on which one field signal has been recorded, two times for reproducing the same field signal (an odd-number field signal according to the present embodiment) twice in sequence, and is then shifted to the next track to be traced. In the same figure, Fo1 represents a reproduced RF modulated signal reproduced by an initial tracing, and Fo2 represents a RF modulated signal reproduced by a succeeding tracing. In the reproducing mode, the superimposed signal is reproduced for an interval $t_6$. The interval $t_6$ corresponds to the stepping interval of the pulse motor 14. In a head transferring interval $t_7$, after double tracing operation of the same track, the video head 16 crosses over an adjacent track and is shifted to the next track position. The signals included in the intervals $t_6$ and $t_7$ are gated and removed as will be described hereinafter, whereby no disturbance whatsoever occurs in the reproduced picture.

Figure 16:
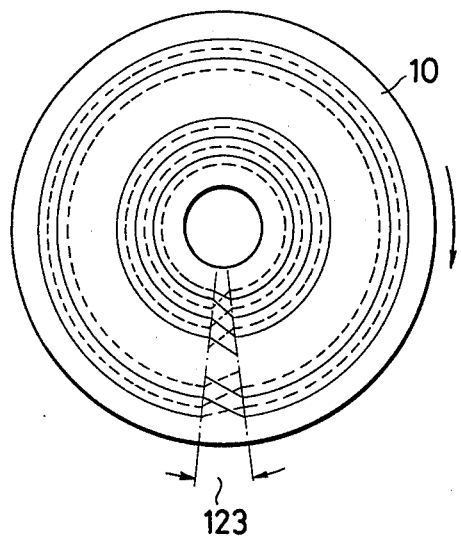
FIG. 16 is a diagram showing a head moving state.

As is apparent from the above description, the video head 16 will undergo intermittent stepping motion in phase with the vertical synchronizing signal of the video signal. Accordingly, in a track pattern on the magnetic medium 10, the vertical synchronizing signals of each circular path are recorded in positions forming a line in a radial direction, and, further, the intermittent shifting operation of the head 16 is conducted within a predetermined angular segment 123 of the magnetic disc, as indicated in FIG. 16.

Figure 17:
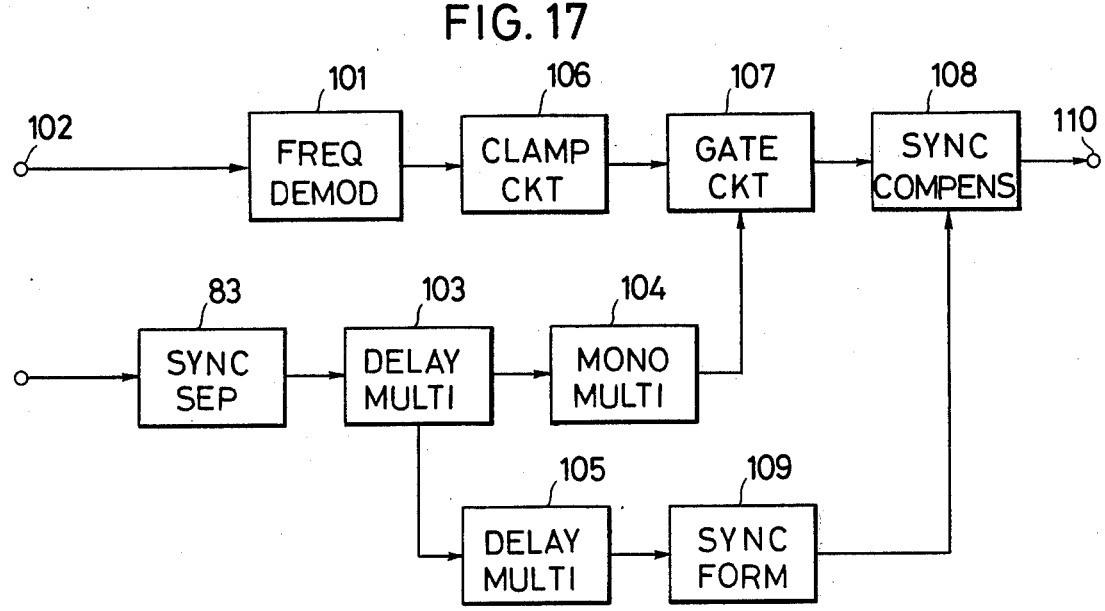
FIG. 17 is a block diagram showing the reproducing system of a video signal recording/reproducing apparatus of field-skip type.

Next, a signal forming process in the reproducing operation will be described. FIG. 17 shows one embodiment of a block diagram of the reproducing system, FIGS. 18A through 18G indicate waveforms of the signals at certain positions in the reproducing side shown in FIG. 17, The reproduced RF output signal indicated in FIG. 15H is supplied to a terminal 102 and then demodulated through the demodulation circuit 101. Whereupon the reproduced video output signal illustrated in FIG. 18A is obtained. In this signal, a random noise is present within the period V.BLK corresponding to the head shifting interval.

A vertical synchronizing signal of 60 Hz indicated in FIG. 18B is separated from the input video signal by the synchronizing signal separation circuit 83 and then fed to a delay multivibrator 103. The multivibrator 103 oscillates with a time constant of about one field, and forms a square wave as shown in FIG. 18C. This square wave is supplied to a monostable multivibrator 104 and to a delay multivibrator 105. The monostable multivibrator 104 is triggered into oscillation responsive to the trailing edge of the output signal from the delay multivibrator in FIG. 18C, and the oscillator generates a gate pulse, as shown in FIG. 18D. The gate pulse is so determined that the gate width thereof coincides substantially with the V.BLK portion of the reproduced video signal indicated in FIG. 18A and is supplied to a gate circuit 107 described hereinafter.

Moreover, the gate width and phase of the gate pulse are appropriately determined depending on the generating position of the random noise accompanying head-shifting operation.

On the other hand, the reproduced video signal illustrated in FIG. 18A is clamped in its black level in a DC manner by way of a DC restoring clamp circuit 106, and then fed to a V.BLK gate circuit 107. At this time, the gate circuit 107 is also supplied with the gate pulse shown in FIG. 18D from the multivibrator 104, whereby the V.BLK portion of the reproduced video signal is removed. Thus, the output signal from the gate circuit 107 becomes a reproduced video signal as shown in FIG. 18F. The V.BLK portions thereof are gated and removed, leaving a bland state, and are then supplied to a vertical synchronizing signal compensating circuit 108.

On the other hand, the signal fed to the delay multivibrator 105 from the above delay multivibrator 103 is delayed to the original phase position of the vertical synchronizing signal of the reproduced video signal and is then fed to a vertical synchronizing pulse forming circuit 109. This signal is converted into a vertical synchronizing pulse signal for compensation, as illustrated in FIG. 18E, having a vertical synchronizing pulse of an appropriate width in the circuit 109 and is then supplied to the above compensating circuit 108.

Accordingly, the compensating vertical synchronizing signal from the forming circuit 109 is added to the blank portion which is removed of the V.BLK portion in the circuit 108. The formed and shaped video signal indicated in FIG. 18G is derived from an output terminal 110.

According to the above embodiment, the video signal is formed by removing the V.BLK portions corresponding to the superimposedly recorded portion and the head transferring portion from the reproduced video signal. However, the video signal can be formed by removing only the V.BLK portion corresponding to the head transferring period. Moreover, during the recording operation, it is possible to apply the erasing pulse signal in FIG. 15E even during the head travelling intervals.

Moreover, in the above embodiment, the vertical synchronizing pulse signal indicated in FIG. 18B is the vertical synchronizing signal separated from the input video signal which is supplied all the time. The signal forming processing operation can be conducted accurately by employing either the pulse signal from the tone-wheel emitting portion 13 or the pulse signal obtained through envelope-detection of the reproduced RF signal.

Moreover, the field signals are changed into the delayed signal and into the undelayed signal in alternate fields by effecting a switching operation of a delay line, having a delay time corresponding to one-half of one horizontal scanning interval. Thus, all field signals are converted into even-number and odd-number field signals, alternately, so as to conduct interlace scanning operation, resulting in a normal reproduction of the video signal. Further, the interlace scanning operation can be effected by selecting the horizontal AFC time constant of the monitoring receiver at a smaller value than the normal value fo accelerating the pulling-in operation.

Full-field system video signal recording and reproducing apparatus

This recording and reproducing apparatus is approximately the same in organization as the above described field-skip system recording and reproducing apparatus. The following description will be set forth with respect to points of difference in their organization.

A video head assembly 130 is constructed, as illustrated in FIG. 19, so that a video head 131 for recording and reproducing the signal, and erasing head 132, and a dummy core 133 are respectively positioned at the vertexes of a triangle and are secured to a mounting base 134. The erasing head 132 is disposed at a slightly advanced position in the rotating direction of the recording medium 10 with respect to the head 131.

The recording operation of the above apparatus will now be described in conjunction with FIGS. 20 and 21A through 21F.

Figure 13:
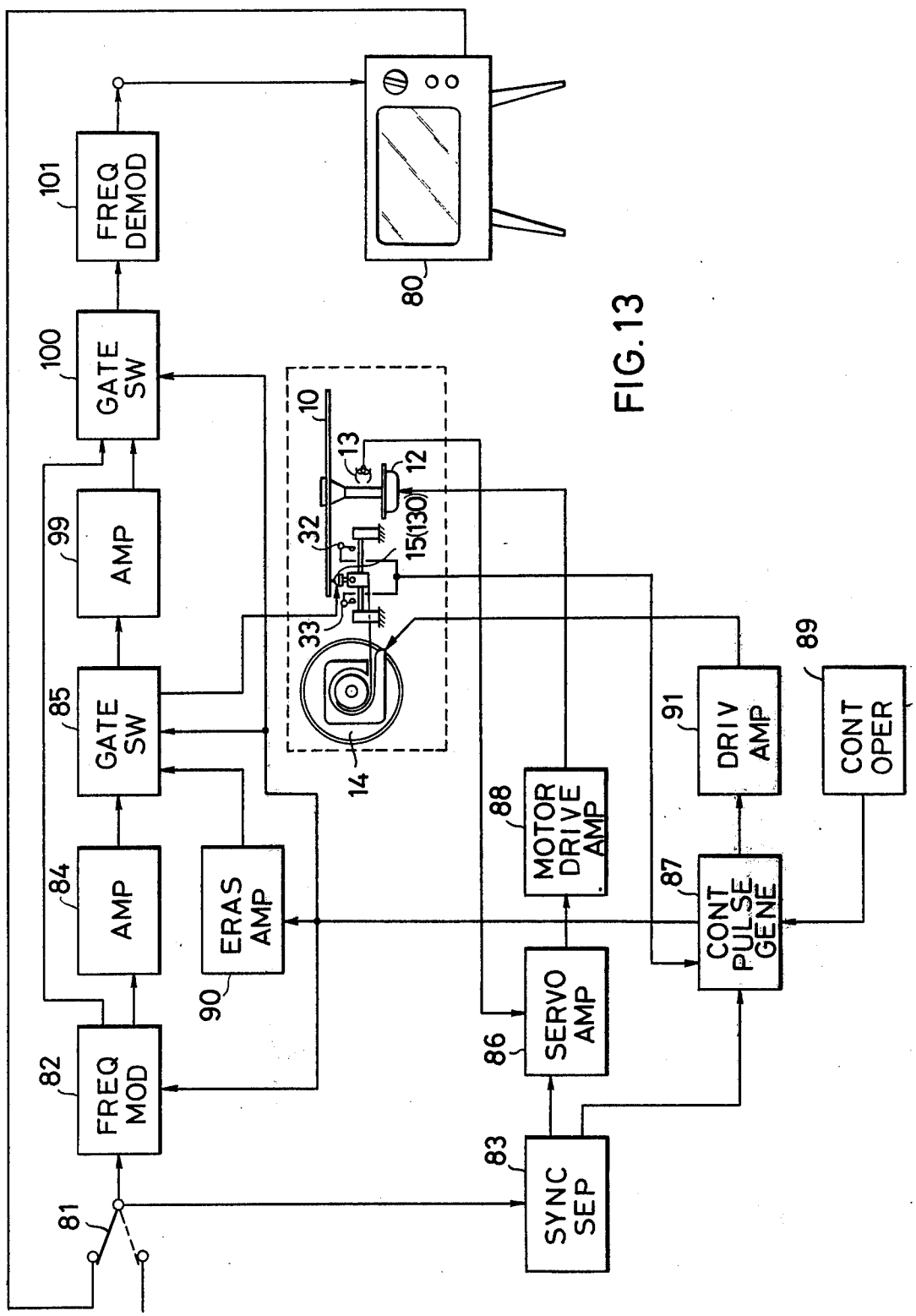
FIG. 13 is a block diagram showing a video signal recording/reproducing apparatus of field-skip type as one embodiment of the recording/reproducing apparatus according to the invention.

FIG. 20 shows a block diagram system associated with the head assembly 130, in which the constituent parts which are the same as those in FIGS. 13 and 19 are designated by the same reference numerals. The input video signal illustrated in FIG. 21A is applied to the synchronizing signal separation circuit 83. The vertical synchronizing pulse as shown in FIG. 21B is separated thereat. In conjunction with the synchronizing pulses, reference pulses for controlling the driving of the pulse motor as illustrated in FIG. 21C are formed with a period of 1/60 sec. This pulse signal is emitted at a moment determined with allowance for the staring delay time $\Delta t$ of the pulse motor 14.

The pulse motor 14 undergoes an intermittent stepping movement in accordance with the step-response characteristics indicated in FIG. 21D. The pulse motor 14, after being delayed by the time $\Delta t$ from the moment of the exciting current application, is stepped for an interval $t_8$ approximately coinciding with the vertical blanking interval of the video signal, and is then held in its stop mode for an interval $t_9$. The stopping interval $t_9$ is $t_9 = 1/60$ sec $- t_1 = 16.6$ msec. $- 1.5$ msec. $= 14$ msec. That is, the pulse motor 14 is intermittently stepped at every revolution of the disc motor 12.

FIG. 21E shows a switching pulse signal generated from the control pulse generating circuit 87. This signal is applied to a terminal 135 in FIG. 20. The gate switcher 85 is thereby actuated so that the recording amplification circuit 84 is selectively connected to the recording and reproducing head 131. Thus, the RF modulated output signal from the amplification circuit 84 is gated and removed with respect to the negative portion of the above switching pulse signal and converted into a gated RF modulated signal, as illustrated in FIG. 21F, wherein the V.BLK portion is gated and removed and is then supplied to the recording and reproducing head 131.

On the other hand, to the erasure amplification circut 90, is applied an erasing pulse signal (not shown) which is advanced with respect to the switching pulse illustrated in FIG. 21E. The advance the time corresponds to the space between the erasing head 132 and the recording and reproducing head 131.

Accordingly, the new information signal to be recorded is succeedingly recorded by the recording and reproducing head 131 in the track, which is the same as the track in which the old information signal has been erased by the erasing head 132 disposed at an advanced position. Moreover, the head 131 forms the forward tracks and the return tracks alternately. The even-number fields and odd-number fields are recorded in sequence respectively on the forward tracks and the return tracks, whereby the full-field recording is accomplished.

In the reproducing operation, the reproduced RF output signal picked up by the head 131 is fed to the reproducing pre-amplifying circuit 99 by way of the gate switcher 85 which has been changed over in its connected state. When the head 131 is shifted one step, it crosses over the adjacent track, whereby the reproduced RF signal becomes a signal as shown in FIG. 21G in which beat, noise, and the like are developed in the portion corresponding to its V.BLK period. This reproduced RF signal is formed and signal-processed, as in the case of the above field-skip system recording and reproducing apparatus, as shown in FIGS. 18A through 18G by the signal-processing circuitry illustrated in FIG. 17. Consequently, a formed video signal as shown in FIG. 18G is obtained.

Moreover, the signal processing operation in slow-motion reproduction, intermittent field reproduction and still motion reproducing operation will be carried out as in the case of the above normal reproducing operation.

According to the above recording and reproducing apparatus, full-field recording and reproducing operations can be achieved by the single video head assembly, and, further, slow motion reproduction and intermittent field reproduction can be carried out without difficulty.

Further, this invention is not limited to these embodiments but various variations and modifications may be made without departing from the scope and spirit of the invention.

What is claimed is:

1. A recording and/or reproducing apparatus comprising a rotating disc recording medium having a recording surface;

means for rotating said medium at a predetermined speed and in synchronization with synchronizing signals supplied thereto during the recording and reproducing modes;

single signal transducing head means for recording and reproducing on said surface an input video signal including cyclically recurring vertical blanking periods, said video signals being recorded in each of a plurality of concentric tracks, each with a successive field recorded thereon;

single step driving means operated responsive to each of said synchronizing signals and each of said vertical blanking periods for intermittently moving said single signal transducing head means step-by-step, said driving means moving said single signal transducing head means from an outer periphery toward an inner periphery of said medium, stopping at each track in a first set of concentric tracks, said driving means reversing the moving direction of the single signal transducing head means responsive to its reaching a given circular track at said inner periphery, and said driving means thereafter intermittently moving the single signal transducing head means step-by-step from the inner periphery toward the outer periphery of the medium, said single signal transducing head means stopping at each track in a second set of concentric tracks, each of said second set of tracks being located midway between corresponding ones of the first set of concentric tracks, said driving means again reversing the moving direction of the single signal transducing head means responsive to its reaching a given circular track at said outer periphery, said single signal transducing head means being moved only in each of said vertical blanking periods;

means effective after each of the steps and during recording for applying said video signals to said single signal transducing head means, said video signal being applied to said single transducing head means by said signal applying means with one complete field being recorded as a unit on each of said tracks;

means effective after each of the steps during reproducing for stepping said single signal transducing head means during a period corresponding to a vertical blanking period and for reproducing the previously recorded video information signal during the period when said single signal transducing head means is stopped;

gate means for removing from the video signal reproduced by said single signal transducing head means that part of each field of signals which substantially corresponds to the period during which said single signal transducing head means steps and for passing the remaining part of said video signal;

means for generating a new vertical synchronizing signal responsive to synchronizing signals continuously supplied from an outside source, said new vertical synchronizing signal corresponding to the vertical synchronizing signal of said video signal reproduced by said signal transducing head means; and means for inserting the new vertical synchronizing signal into a part of the reproduced video signal which has passed through the gate means in each field of said video signal.

2. A recording and/or reproducing apparatus as set forth in claim 1 which further comprises means for applying an erasing bias signal to said single signal transducing head means during one field of the video information signal following each stepping of the single signal transducing head means, and means responsive to the vertical blanking period of said input video signal for operating the stepping means for causing the single signal transducing head means to step at a rate of one step every other field, means effective during a field period immediately after stepping during the recording mode for causing said single signal transducing head means to erase a previously recorded one field signal, means also effective during a recording mode for recording said input video signal during the field next succeeding said one field, and means effective during the reproducing mode for twice reproducing each track.

3. A recording and/or reproducing means as set forth in claim 1 which further comprises means for positioning an erasing head at a position in advance of said single signal transducing head means for erasing the track on which the video signal is to be recorded by said single signal transducing head means, and means for operating said stepping means within the vertical blanking period to move said signal transducing head means and said erasing head responsive to each field of the video signal.

4. A recording and/or reproducing apparatus as set forth in claim 1 in which said stepping means comprises: a pulse motor, means for continually supplying said motor with a constant number of pulses to step it intermittently through a specific rotational angle in either of two rotational directions, means responsive to the intermittent rotation of said pulse motor for translationally stepping said single signal transducer head means over two track pitches on the recording medium, said motor reversing its direction of rotation to provide said reversing head motion at said inner and outer peripheries, means for restricting the stepping distance to one track pitch in response to the initial pulse motor operation after each reversal of the rotational direction of the pulse motor, and an exciting current supply means for controlling the exciting current supplied to said pulse motor to prevent the exciting current from being supplied thereto during the period when it is stopped and to enable the exciting current to be supplied thereto only during the period while the motor starts to step.

* * * * *